(12) United States Patent
Douglas et al.

(10) Patent No.: US 7,881,879 B2
(45) Date of Patent: Feb. 1, 2011

(54) METHODS AND SYSTEMS FOR WHEEL BALANCER MATCHING AND FLAT SPOT CORRECTION

(75) Inventors: Michael Wayne Douglas, St. Charles, MO (US); David Merrill Scribner, Wentzville, MO (US); Joel Allen Clasquin, Edwardsville, IL (US)

(73) Assignee: Hunter Engineering Company, Bridgeton, MO (US)

( * ) Notice: Subject to any disclaimer, the term of this patent is extended or adjusted under 35 U.S.C. 154(b) by 191 days.

(21) Appl. No.: 12/118,859

(22) Filed: May 12, 2008

(65) Prior Publication Data

US 2008/0282799 A1 Nov. 20, 2008

Related U.S. Application Data

(60) Provisional application No. 60/938,656, filed on May 17, 2007.

(51) Int. Cl.
*G06F 19/00* (2006.01)
*G01M 17/02* (2006.01)

(52) U.S. Cl. .......................................... 702/34; 73/146
(58) Field of Classification Search .................... 702/34; 73/146, 460, 462
See application file for complete search history.

(56) References Cited

U.S. PATENT DOCUMENTS

| 3,556,194 | A | | 1/1971 | Farrington |
| 3,595,295 | A | | 7/1971 | Curry |
| 3,708,008 | A | | 1/1973 | Schildmeier |
| 3,865,527 | A | | 2/1975 | McGehee et al. |
| 3,945,277 | A | | 3/1976 | McGehee et al. |
| 5,073,217 | A | * | 12/1991 | Fogal .......................... 156/75 |
| 6,523,408 | B1 | * | 2/2003 | Colarelli et al. ............... 73/460 |
| 7,096,150 | B2 | | 8/2006 | Shavers et al. |
| 7,355,687 | B2 | * | 4/2008 | Voeller et al. .......... 356/139.09 |

OTHER PUBLICATIONS

Dan Parker et al; Tire Uniformity Tester for Automotive Service Industry; 2000;Hunter Engineering Co, 13 pages.*

* cited by examiner

*Primary Examiner*—Bryan Bui
(74) *Attorney, Agent, or Firm*—Armstrong Teasdale LLP (57) ABSTRACT

Methods and systems for a computer implemented method of analyzing a vehicle wheel assembly including a tire and a rim is provided. The method includes removably mounting a wheel assembly on a shaft having a longitudinal axis and being rotatable about the longitudinal axis to rotate the wheel assembly, applying a substantially radial force to the wheel assembly during rotation thereof, and measuring variations in the radial force from at least one of radial runout, tire uniformity, and tire flatspotting. The method also includes determining a condition of the wheel assembly based on a spectral density analysis of the measured variations.

23 Claims, 4 Drawing Sheets

METHODS AND SYSTEMS FOR WHEEL BALANCER MATCHING AND FLAT SPOT CORRECTION

CROSS REFERENCE TO RELATED APPLICATIONS

This application claims priority to and the benefit of the filing date of U.S. Provisional Application No. 60/938,656 filed on May 17, 2007, which is hereby incorporated by reference in its entirety.

BACKGROUND OF THE INVENTION

This invention relates generally to balancing vehicle wheels and more particularly, to methods and systems for matching vehicle wheels using a balancer that includes a load roller.

At least some known vehicle wheel assemblies use tires comprising a number of different material compositions. Some of such compositions may be more susceptible to a condition commonly referred to as "flatspotting." Recent evidence suggests that the flat spotting problem has been escalating because of the increased use of low profile, increased sidewall stiffness tires. Most often the flat spotting is caused by the vehicle sitting in a parking lot, especially in hot weather. Extreme cases occur with long term vehicle storage by dealerships. When a vehicle stands for an extended period of time, those portions of the tires which are in contact with the ground flatten to match the ground surface. The flattened portion tends to be retained for a substantial period of time after the vehicle is placed in operation. As the tire rotates, there is a noticeable thumping or slapping sound resulting from the flat spot on the tire. With many tire compositions, the flat spot runs out quickly. However, the properties of some tire compositions are such that the flatspotting is retained substantially longer than with other tires or may become permanent.

Although severe radial force variation issues can be caused by flat spotted tires, no known wheel balancers are able to recognize a flat spot. Known techniques require the flat spot to be massaged out of the tire before balancing and/or computing the matching mark locations for the rim and tire, therefore errors and an improper diagnosis occur for this possibly temporary condition. For example, an original equipment manufacturer technical service bulletins requiring repair shops to drive vehicles for twenty miles in hopes of massaging out flat spots. Not only is this an unreasonable task for shops to perform but they have no way of knowing if any of the tires are even flat spotted to begin with. Time constraints prevent shops from driving every car for twenty miles "just in case." Additionally a flat spot introduces higher order harmonics into a radial force variation measurement that are not typically utilized for diagnosing tire conditions.

BRIEF DESCRIPTION OF THE INVENTION

A wheel assembly includes a tire coupled to a wheel rim. In one embodiment, a computer implemented method of analyzing a vehicle wheel assembly includes removably mounting a wheel assembly on a shaft having a longitudinal axis and being rotatable about the longitudinal axis to rotate the wheel assembly, applying a substantially radial force to the wheel assembly during rotation thereof, and measuring variations in the radial force from at least one of radial runout, tire uniformity, and tire flatspotting. The method also includes determining a condition of the wheel assembly based on a spectral density analysis of the measured variations.

In another embodiment, a method of matching a tire to a rim of a wheel includes mounting a wheel assembly on the balancer spindle, determining radial force variation of the wheel assembly, and analyzing the tire force variation using spectral density analysis. The method also optionally includes outputting a relative rotational mounting position of the tire with respect to the wheel rim to minimize the spectral density analysis value.

In yet another embodiment, a wheel balancer system includes a shaft adapted for receiving a wheel assembly wherein the shaft includes a longitudinal axis and is rotatable about the axis so as to rotate the wheel assembly removably mounted thereon and a sensor assembly for measuring rotation of the shaft about the longitudinal axis. The wheel balancer system also includes a vibration sensor assembly for measuring vibration of the wheel assembly as the wheel assembly is rotated, a motor operatively connected to the shaft for rotating the shaft about the longitudinal axis, and a load roller including a first diameter for applying a generally radial force to the wheel assembly. The wheel balancer system further includes a sensor for measuring a variation of the radial force during rotation of the wheel assembly and a control circuit configured to at least one of the measured vibration of the wheel assembly and the measured radial force variation to determine flatspotting of the tire and output an indication of flatspotting and information relating to the location and magnitude of the flat spot to a user.

DETAILED DESCRIPTION OF THE INVENTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
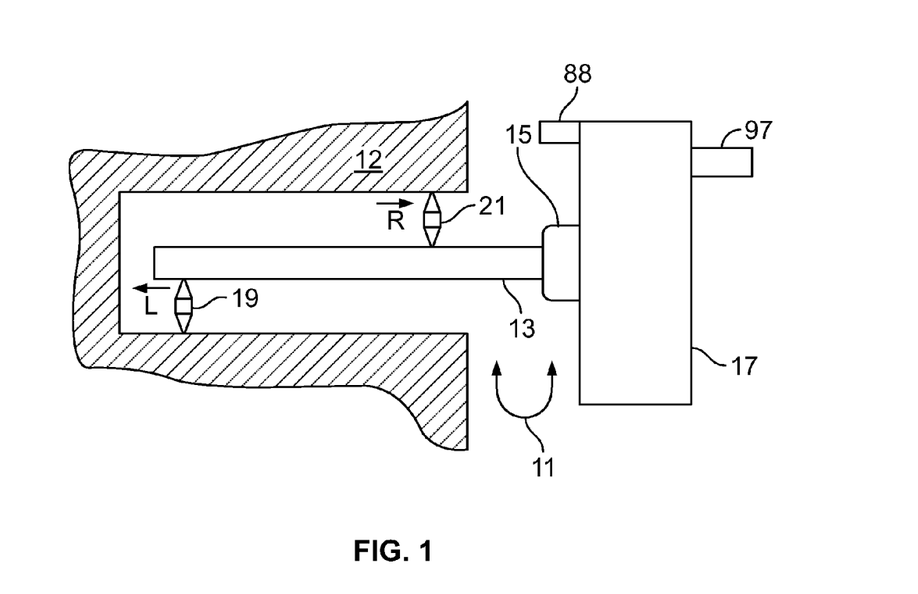
FIG. 1 is a schematic diagram of a wheel balancer in accordance with an embodiment of the present invention.

FIG. 1 is a schematic diagram of a wheel balancer 11 in accordance with an embodiment of the present invention. The particular balancer shown is illustrative only, since the particular devices and structures used to obtain imbalance, runout, and force variation information could readily be changed without changing the present invention. Balancer 11 includes a rotatable shaft or spindle 13 driven by a suitable drive mechanism such as a motor M and drive belt 53 (shown in FIG. 2). A shaft encoder 15 coupled to shaft 13 is configured to provide speed and rotational position information to control circuitry (shown in FIG. 3).

Figure 2:
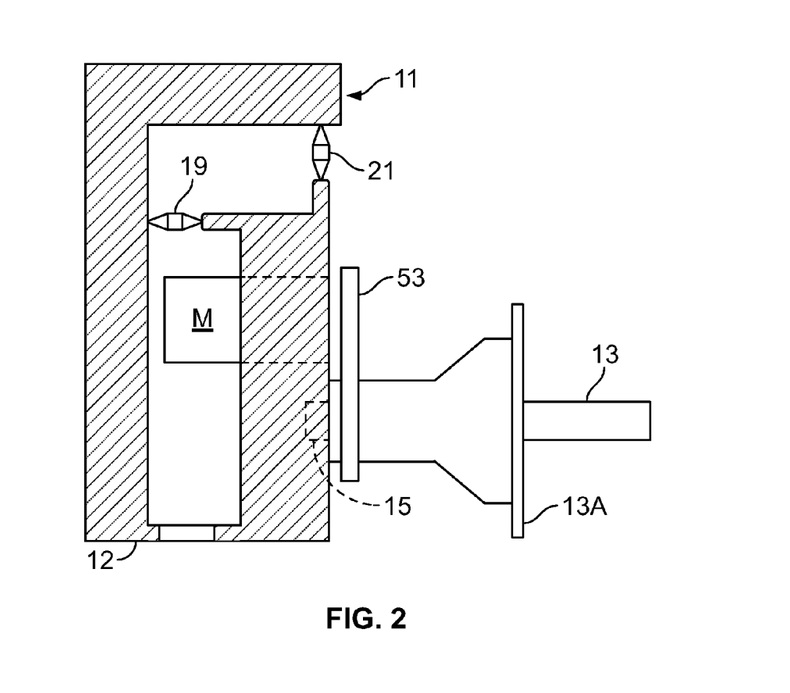
FIG. 2 is another schematic diagram of wheel balancer (shown in FIG. 1)

During the operation of wheel balancing, at the end of spindle 13, a wheel assembly 17 under test is removably mounted for rotation with a spindle hub 13A (shown in FIG. 2). To determine wheel assembly imbalance, the balancer includes at least a pair of piezoelectric type imbalance force sensors 19 and 21 (or other suitable sensors such as strain gauges) coupled to spindle 13 and mounted on the balancer base 12.

FIG. 2 is another schematic diagram of wheel balancer 11 (shown in FIG. 1). When wheel assembly 17 is unbalanced, it vibrates in a periodic manner as it is rotated, and these vibrations are transmitted to spindle 13. Imbalance force sensors 19 and 21 are responsive to these vibrations of spindle 13. Specifically, imbalance force sensors 19 and 21 generate a pair of analog electrical signals corresponding in phase and magnitude to the vibrations of the spindle at the particular transducer locations. These analog signals are input to control circuitry (shown in FIG. 3) described below, which determines the required magnitudes and positions of correction weights to correct the imbalance.

Figure 3:
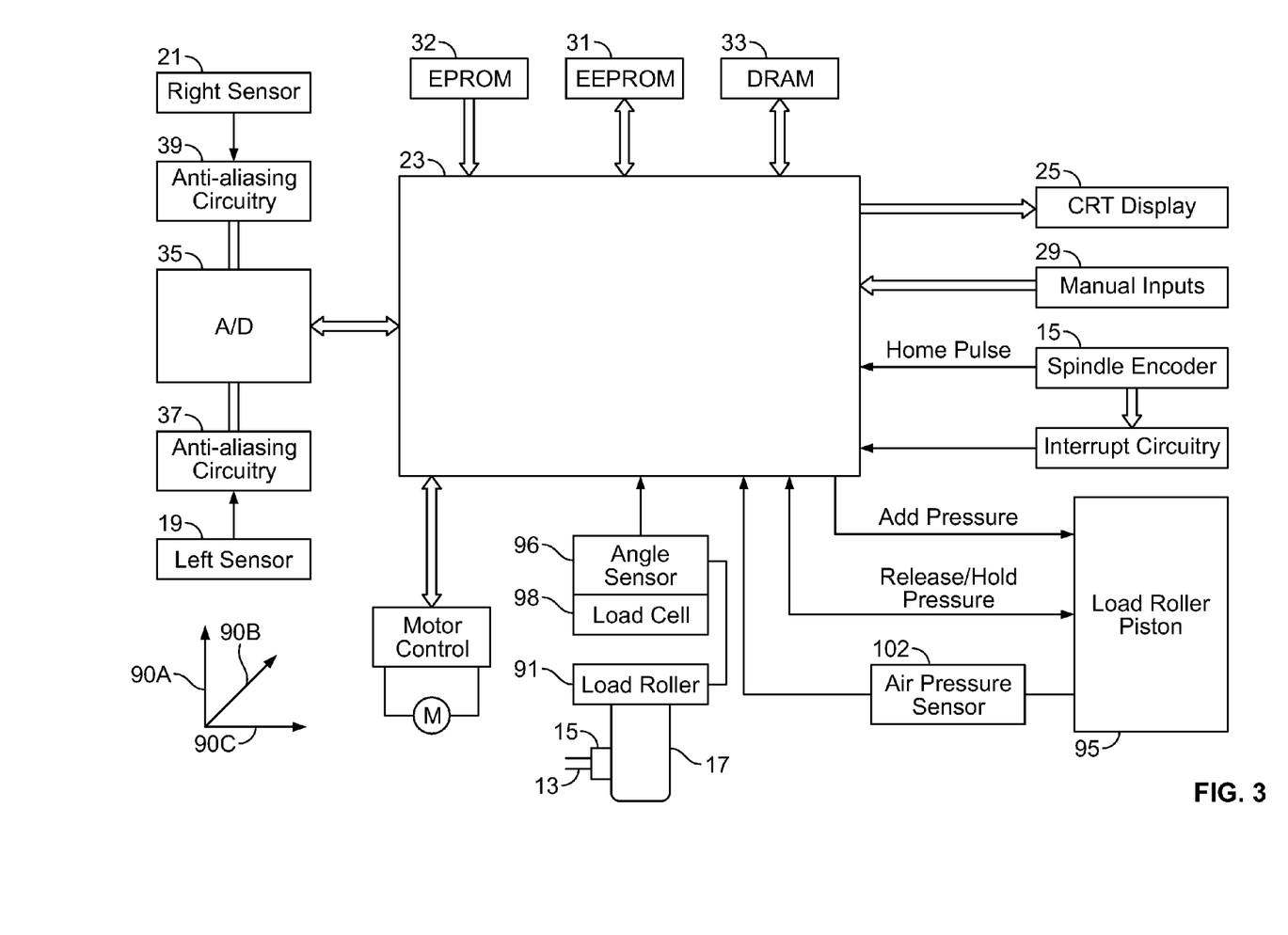
FIG. 3 is a schematic diagram of control circuitry that may be used with balancer (shown in FIGS. 1 and 2)

FIG. 3 is a schematic diagram of control circuitry that may be used with balancer 11 (shown in FIGS. 1 and 2). In the exemplary embodiment, wheel balancer 11 also includes a spindle encoder 15, and a computer or CPU 23. CPU 23 is configured to perform signal processing on the output signals from imbalance force sensors 19 and 21 to determine wheel imbalance and other conditions of wheel assembly 17. CPU 23 is communicatively coupled to and is configured to control a display 25 which provides information to a user, control motor M through motor control circuitry 27, and monitors a position of spindle 13 from encoder 15.

Balancer 11 also includes manual inputs 29 (such as a keyboard and parameter input data dials) which are also connected to CPU 23. In the exemplary embodiment, CPU 23 has sufficient capacity to control via software all the operations of the balancer in addition to controlling the display. CPU 23 is connected to memory such as EEPROM memory 31, EPROM program memory 32, and dynamic RAM (DRAM) memory 33. EEPROM memory 31 is used to store non-volatile information, such as calibration data, while CPU 23 uses DRAM 33 for storing temporary data. CPU 23 is also connected to an analog-to-digital converter (ADC) 35. The signals from sensors 19 and 21 are supplied through anti-aliasing circuitry 37, 39 (if needed) to ADC 35.

Three contact forces are defined as a radial force 90A, a lateral force 90B and a tractive force 90C are present between wheel assembly 17 and load roller 91. As used herein, tire uniformity refers to a condition in which some property of a tire is not symmetric about its rotational axis. There are a plurality of uniformity parameters which can be quantified.

Load roller 91 is positioned adjacent wheel assembly 17 so that it may be forced into engagement with the tire so as to measure loaded runout of wheel assembly 17. More specifically, load roller 91 is carried on a shaft 92 journaled on an L-shaped arm 93 designed to pivot about the axis of a shaft 94. CPU 23 causes the arm to pivot to place load roller into engagement with the tire by actuating for example, an air cylinder 95 or an air bag actuator. Air pressure to cylinder 95 can be variably adjusted by CPU control. Air pressure feedback is provided by a sensor 102. The feedback enables precise load roller forces to be generated and the CPU can detect pressure problems and remove air pressure if needed.

Rotation of shaft 94 is sensed by a sensor 96 and the amount of rotation is transmitted to CPU 23.

By applying a known force to the tire with the load roller and monitoring the output of sensor 96, CPU 23 can determine the loaded runout of wheel assembly 17. CPU 23 uses the output of sensor 96 to measure the runout of wheel assembly 17 under the predetermined load. In an alternative embodiment, load roller 91 is fixed and a load cell 98 coupled to load roller 91 is monitored to provide a signal to CPU 23 indicative of the force applied to wheel assembly 17.

In addition, CPU 23 is coupled to sensors 88 and 97 for measuring the axial and radial runout of the inside and outside wheel rims of assembly 17 at the bead seats. These outputs are radial and axial wheel rim runout signals. The first harmonic of radial wheel rim runout (both angle and magnitude) is determined by CPU 23 using a suitable procedure such as digital filtering, discrete Fourier transform (DFT), or spectral density analysis (SDA). The same process can be performed to determine axial runout for each wheel rim. With both tire and wheel rim roundness measurements, CPU 23 is able to compare the measured values with stored wheel rim and tire runout specifications. When those specifications are not met, one can calculate a remounted orientation of the tire on the wheel rim that minimizes the total loaded runout. CPU 23 causes the display of such an orientation on display 25, along with the residual loaded runout which would remain after remounting. Alternatively, this information may be used to calculate the positions and amounts of required tire grinding to correct the loaded runout.

Figure 4:
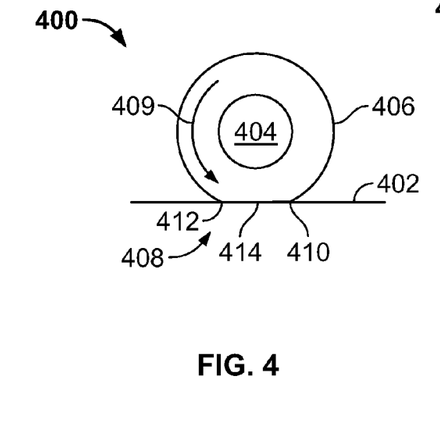
FIG. 4 is a side view of a wheel assembly at rest on a flat surface.

FIG. 4 is a side view of a wheel assembly 400 in contact with a flat surface 402. In the exemplary embodiment, tire assembly 400 includes a rim 404 and a tire 406 circumferentially engaged to rim 404 through for example, a bead and flange arrangement (not shown). Tire 406 includes a flat spot 408 that includes, in a direction 409 of rotation, a leading edge 410, a trailing edge 412, and a substantially flat portion 414 extending therebetween. Typically, tire 406 is maintained in regular rolling engagement with surface 402 by use. However, after relatively long periods of inactivity flat spot 408 remains in tire 406 even after an amount of resumed rolling engagement with surface 402. Tires flatspot when they remain loaded without rolling for a period of time. When the tires are rolled again, the initial flat spot decays and vanishes or stabilizes to a much smaller magnitude (called residual flatspot). Flatspot is a low harmonic phenomenon and primarily contributes to the first three or four harmonics of tire run out. The tire non-uniformity caused by a flat spot may induce noticeable vibrations in some vehicles during operation in the decay process. Flat spot 408 engaging surface 402 at each revolution of tire 406 causes a noticeable slap and/or vibration.

The magnitude and decay of flat spot 408 depends on many factors such as but not limited to tire construction, material creep properties, tire radial load and time duration, inflation, tire and ambient temperatures, and tire mileage.

Figure 5:
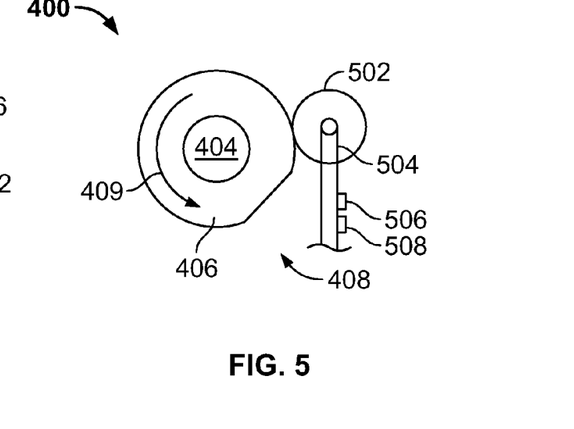
FIG. 5 is a side view of a wheel assembly mounted on for example, a vehicle wheel balancing system that includes a load roller.

FIG. 5 is a side view of a wheel assembly 400 mounted on for example, a vehicle wheel balancing system (not shown) that includes a load roller 502. Load roller is configured to apply an inwardly radial force on an outer peripheral surface of tire 406 while wheel assembly 400 is rotated on the vehicle wheel balancing system. In an embodiment, load roller 502 is capable of applying a relatively large force to tire 406 that can be used to simulate wheel assembly 400 rolling on a road surface. In other embodiments, load roller 502 is configured to merely contact the outer peripheral surface of tire 406 to for example, measure an out-of-roundness or other features of tire 406.

Load roller 502 is supported and the radial force applied to tire 406 is controlled through a support arm 504. In the exemplary embodiment, support arm 504 includes a force sensor 506 and a vibration sensor 508. In an alternative embodiment, force sensor 506 and vibration sensor 508 is a single sensor.

During operation, wheel assembly 400 is rotated at a predetermined rotational speed, support arm 504 is moved to bring roller 502 into contact with tire 406. The vehicle wheel balancing system detects a flat spot automatically while measuring radial road force. In one embodiment, the magnitude and phase of first harmonic radial force variation is monitored and continuously re calculated during an extended loaded spin of wheel assembly 400, and a continuously improving radial force variation value is indicative of a flat spot condition. The flat spot may be massaged out of tire 406 by continuing to spin tire 406 under load without the necessity of a road test.

In an alternative embodiment, force sensor 506 and vibration sensor 508 outputs are monitored for a characteristic output that corresponds to a flat spot in tire 406. A permanent or persistent flat spot may not exhibit any improvement during an extended loaded spin of wheel assembly 400, however the improved detection algorithm described herein directly detects the 'signature' of a flat spot 408. Both automatic process control and user initiated procedural steps are employed to determine the location, position, and potential causes of the flat spot and determine if it is feasible to correct the flat spot. Based at least in part on this feasibility measurements can be taken at different tire pressures and/or load roller forces than are typically used. A non-contact measurement using for example, laser, sonar, radio frequency or a lightly loaded roller making only contact with tire 406 is also used to detecting and characterize flatspotting. The non-contact methods may provide a simple alert of a flat spot on balancers which do not employ a loaded roller.

In another alternative embodiment, when an alert that a flat spot exists, additional advanced diagnostics are also provided. For example, a progress status feedback indicator may be used to indicate the trend in removing the flat spot. The trend may be automatically analyzed by CPU 23 to predict an amount of spin time that will be needed to reduce the magnitude of the flat spot to less than a predetermined limit. Other options include but are not limited to choosing between extending the spin time to obtain further flat spot improvement and selecting a different tire to be matched to the rim. Light loading with the roller may also alert the user to a relatively rare but important case of tread surface bubbles which could misleadingly appear to be remedied under the high roller loads of the current radial force variation measurement process. High loading with the roller at greatly reduced tire pressure could aid in seating the tire beads properly, substantially eliminating a source of error in the flat spot identification.

In still another alternative embodiment, if the flat spot is not completely removed but still may benefit from road driving to further massage the flat spot, vehicle wheel balancing system predicts the uniformity condition of tire 406 without the flat spot. Determining the uniformity condition of tire 406 as if the flat spot did not exist permits tire-to-rim matching mark locations to be computed for a tire condition which will occur later after the customer leaves the shop and the flat spot is massaged out of tire 406. This eliminates the need to physically remove the flat spot before measuring the wheel and tire on the balancer as currently required by original equipment manufacturers such as by road testing tire 406 for twenty minutes prior to testing.

Determining whether a flat spot is permanent also provides documentation and vital identification regarding the permanent flat spots for procedures that may permit garages and tire shops to reject and return tires for credit. A printout indicates proof of the flat spot as well as steps performed to properly diagnose the tire.

Force imparted into tire 406 by roller 502 may be increased or decreased to facilitate detecting perturbations in the outputs of force sensor 506 and vibration sensor 508 that are characteristic of a flat spot 408. When flat spot 408 is detected, a phase measurement indicates a relative position of flat spot 408. The outputs of force sensor 506 and vibration sensor 508 may be processed by the vehicle wheel balancing system using an algorithm that includes for example, but not limited to a Spectral Density Analysis (SDA) or Fourier Transform such as a Fast Fourier Transform (FFT) or Discrete Fourier Transform (DFT) to determine forces that are distributed over various frequencies.

Radial force variation is the change in force in the radial direction between wheel assembly 400 and load roller 502 when the distance between the axis of wheel assembly 400 and load roller 502 is held fixed. The average load between wheel assembly 400 and load roller 502, and the tire air pressure are held to predetermined values. Loaded radial runout is the change in distance between wheel assembly 400 and load roller 502 when the load between wheel assembly 400 and load roller 502 is held at a substantially constant predetermined value and the distance between wheel assembly 400 and load roller 502 is allowed to vary.

Radial force variation or loaded radial runout can be expressed in a variety of ways. Radial force variation can be expressed as a graph of force vs. location around the circumference of the tire. Radial force variation can be expressed as a maximum force minus a minimum force. A root mean square value of force over the circumference can also be used to express radial force variation. Radial force variation can also be expressed as the first harmonic value of radial force variation, typically employing the Discrete Fourier transform (DFT) or the first harmonic result from a full frequency content evaluation Fourier transform. The first harmonic value is the once per revolution component of the Fourier transform of the force vs. circumferential location. This first harmonic value is essentially the sine wave of a once per revolution period which most closely matches the force vs. circumferential location graph.

A value for the tire stiffness is used to convert wheel rim runout into radial force variation due to wheel rim runout, wheel rim runout multiplied by tire stiffness equals radial force variation due to wheel rim runout. Loaded radial runout of the wheel tire assembly can also be converted to a force variation value by using the tire stiffness or it can be measured directly. By subtracting the wheel force variation from wheel assembly 400 force variation, the tire force variation can be obtained. By shifting the angle of the tire force variation relative to the wheel force variation, the wheel assembly 400 force variation can be computed at many remount angles of tire to wheel. Selecting the remount angle with the lowest wheel assembly 400 radial force variation is then possible.

In an alternative embodiment, a Spectral Density Analysis (SDA) algorithm is used to calculate match mount magnitudes and phase angles of tire 406 and rim 404 rather than individual DFTs for each harmonic alone. SDA weights and biases multiple harmonics, not just the Radial First Harmonic (R1H). Using SDA during match mounting accounts for the magnitude and phase angle of multiple harmonics into a single measurement value. Prior art systems, such as the Hunter GSP9700, utilize only the R1H to determine optimal tire/wheel matching.

Figure 6:
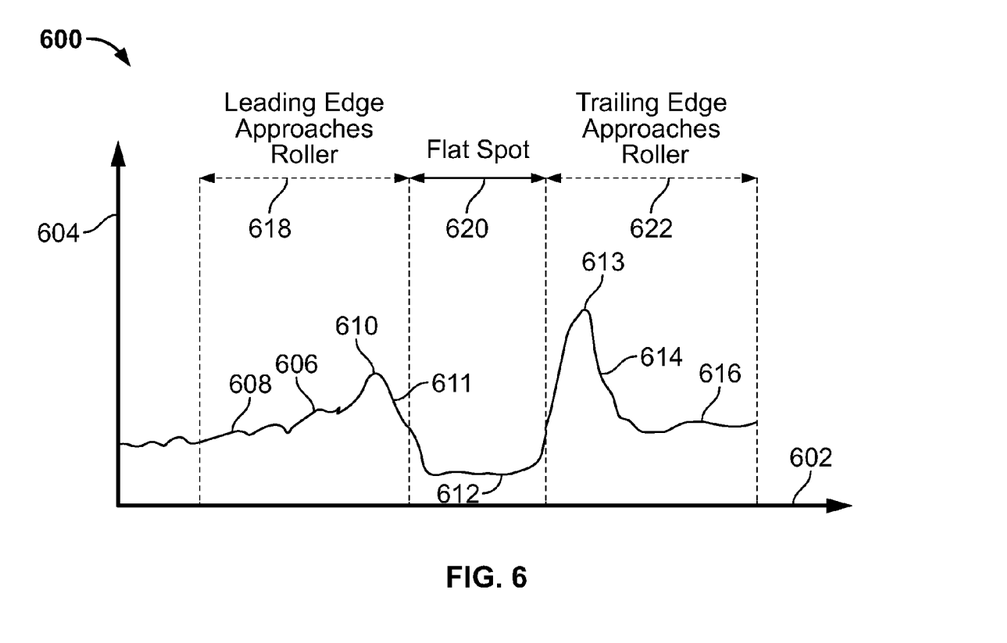
FIG. 6 is a graph of vibration power level with respect to phase of an exemplary flatspotted tire.

FIG. 6 is a graph 600 of vibration power level with respect to phase of an exemplary flatspotted tire. In the exemplary embodiment, graph 600 includes an x-axis 602 graduated in units of for example, circumferential distance about tire 406, phase angle, or time that is relatable to the rotational speed of the tire. Graph 600 includes a y-axis 604 that is graduated in units of vibration power level. In the exemplary embodiment, a trace 606 describes the vibration level of tire 406 during rotation with load roller 502 contacting tire 406 at some point about the periphery of tire 406. In an alternative embodiment, trace 606 describes the force level of roller 502 acting against tire 406, for example, when roller 502 is engaged with tire 406 at a predetermined force level and then locked in position. A radial force between tire 406 and roller 502 is then relatable to a uniformity or outer contour of tire 406 as it rotates in contact with roller 502.

As tire 406 rotates in direction 409 of rotation, roller 502 imparts a nominal amount of force to tire 406 as illustrated during a period 608. As leading edge 410 approaches roller 502 the amount of force spikes 610 and then decays rapidly 611 as the outer peripheral surface of tire 406 at flat portion 414 passes across roller 502. While rotating through flat portion 414 the force is relatively lower 612 than the nominal amount. At trailing edge 412, roller 502 engages tire 406 and the amount of force spikes 613 and then decays rapidly 614 to a force that is approximately nominal 616, and as tire 406 continues to rotate the force steadies at approximately nominal value 616. In the frequency domain, trace 606 includes a characteristic signature for a flat spot at periods 618, 620, and 622. The particular signature each tire 406 may be affected by many factors including but not limited to tire composition, size, amount of time the tire sat idle, the temperature of the tire during the idle time, the tire pressure during the idle time, the tire pressure during rotation in contact with roller 502, distance the tire was driven between formation of the flat spot and the rotation in contact with roller 502, and the speed at which the tire was driven between formation of the flat spot and the rotation in contact with roller 502. The frequency content may be of trace 606 may be analyzed using for example, but not limited to DFT, FFT, SDA to determine the signature of each of areas 618, 620, and 622, individually or in combination. Additionally, the signature of areas outside of areas 618, 620, and 622 may be used to facilitate determining the presence of a flat spot on tire 406.

Figures 7, 8:
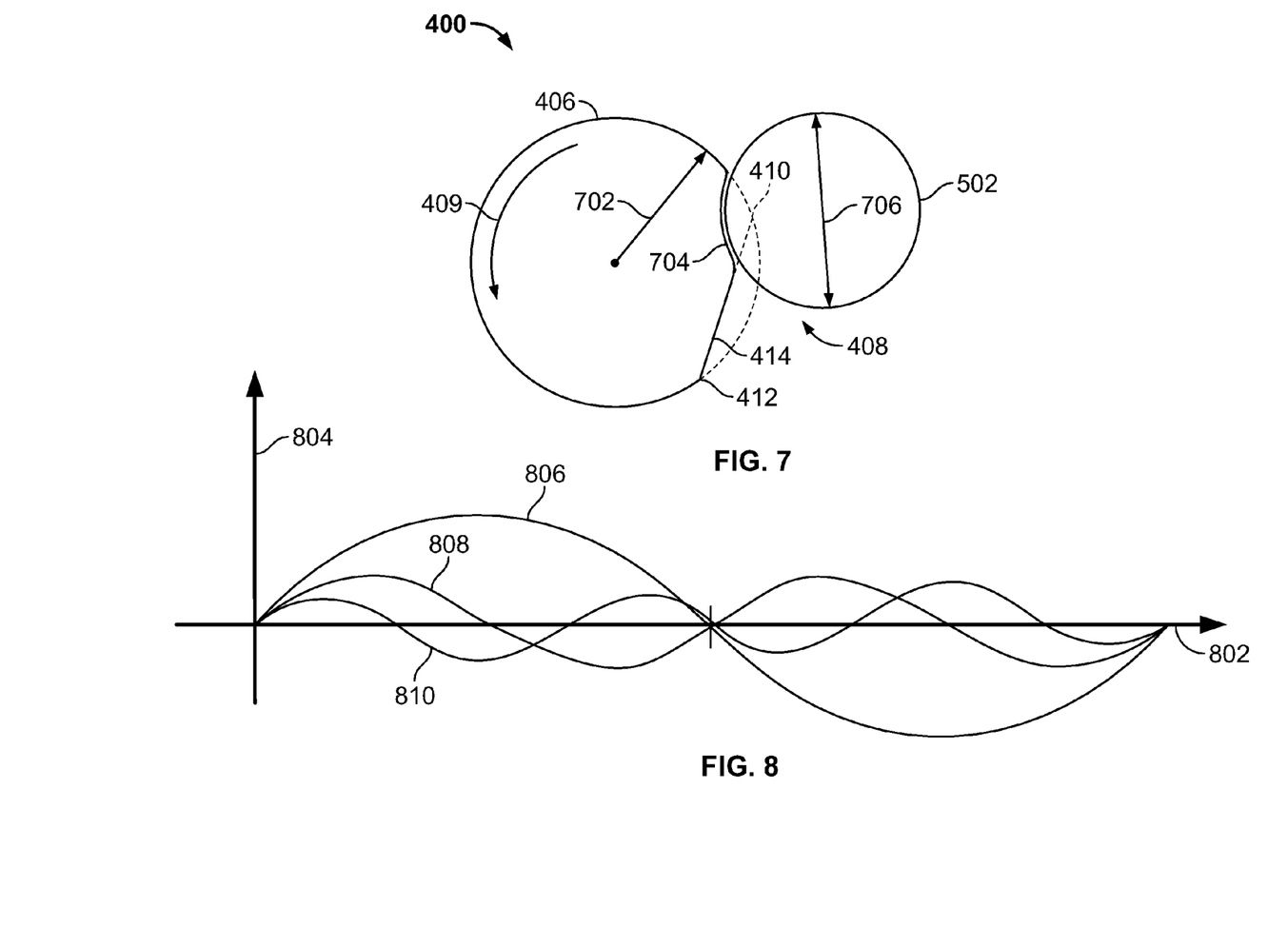
FIG. 7 is another side view of wheel assembly mounted on the vehicle wheel balancing system that includes load roller.
FIG. 8 is a graph of exemplary vibration harmonic components with respect to phase.

FIG. 7 is another side view of wheel assembly 400 mounted on the vehicle wheel balancing system (not shown) that includes load roller 502. In the exemplary embodiment, when the presence and location of flat spot 408 is determined, flat spot 408 may be removed using several methods. Wheel assembly 400 may be rotated on the vehicle wheel balancing system with roller 502 in contact with tire 406 simulating driving tire 406 on the road using a predetermined speed and force profile to 'massage' flat spot 408 out of tire 406. Additionally, the speed and force profile may be determined by the response of tire 406 to the massaging procedure. Furthermore, the tire pressure may be varied to increase or reduce the response of tire 406 to the force being applied by roller 502. Heat may also be applied to tire 406 during the massaging procedure to further simulate road-driving conditions. A force may be applied to tire 406 by load roller 502 while wheel assembly 400 is substantially stationary on the vehicle wheel balancing system. In the exemplary embodiment, the force is applied at leading edge 410. In other embodiments, the force is applied to trailing edge 412. The force may be applied such that the outer peripheral surface of tire 406 is pushed inwardly past where a nominal radius of tire 406 would be without flat spot 408. The inward radial force applied by roller 502 generates a conformal area 704 on a surface of tire 406 that tends to over compensate for the out-of-roundness of tire 406 at leading edge 410. Increasing or decreasing the size of conformal area 704 is facilitated by changing the air pressure in tire 406, changing the position of roller 502, and changing a diameter 406 of roller 502. Wheel assembly 400 may be rotated relatively slowly to facilitate removing flat spot 408 and returning tire 406 to its nominal substantially circular shape.

FIG. 8 is a graph 800 of exemplary vibration harmonic components with respect to phase. In the exemplary embodiment, graph 800 includes an x-axis 802 graduated in units of for example, circumferential distance about tire 406, phase angle, or time that is relatable to the rotational speed of tire 406. Graph 300 includes a y-axis 804 that is graduated in units of vibration power level. In the exemplary embodiment, a trace 806 describes a radial first harmonic (R1H). A trace 808 describes a radial second harmonic (R2H). A trace 810 describes a radial third harmonic (R3H). All areas below the curve of the harmonics together are combined and this is essentially the SDA measurement that takes into account the energy produced by multiple harmonics. In the exemplary embodiment, an SDA algorithm is configured to bias the overall tire and wheel assembly magnitude towards the most resonant frequency of the tire and wheel assembly that affects vehicle suspension resonance. Such resonant frequency may be empirically derived or may be based on manufacturer or other determination or analytical derivation. Typically, the resonant frequency is biased towards the R1H. An SDA algorithm is an effective use of multiple harmonics as a whole in determining match mounting and flatspotting in tire and wheel assemblies. The SDA algorithm used for match mounting automatically biases towards the harmonic that has the highest magnitude and may raise the magnitude and change phase angle when match mounting. The effects in comparison to a pure R1H would be that the overall reading of the SDA matching measurements would be higher than a pure R1H measurement if there are higher order harmonics effecting the overall TWA measurements. This would weight the SDA measurement to be higher than the traditional R1H when used for diagnosis and replacement use.

R2H and R3H responses may affect the result for TWA that have excessive non-uniformities. These small occurrences transpire due to wheel damage, tire-mounting error to the rim bead seat and individual tire force variation due to flat spotting and manufacturing issues.

The above-described methods and systems for determining match marks and flat spots in vehicle wheels are cost-effective and highly reliable. The methods include analyzing radial force variations using spectral density and determining flatspoting in the tire using a characteristic signature of the flat spot. Accordingly, the above described systems and methods facilitate remedying tire performance issues.

While the invention has been described in terms of various specific embodiments, those skilled in the art will recognize that the invention can be practiced with modification within the spirit and scope of the claims.

What is claimed is:

1. A computer implemented method of analyzing a vehicle wheel assembly including a tire and a rim, the method utilizing a wheel balancer system including a drive shaft having a longitudinal axis and being rotatable about the longitudinal axis, a load roller, and at least one sensor, and a computer receiving a signal input from the at least one sensor, the vehicle wheel assembly removably mountable to the drive shaft, and said method comprising:

rotating the wheel assembly about the longitudinal axis with the drive shaft while the wheel assembly is mounted thereto;

applying a substantially radial force to the wheel assembly with the load roller;

measuring variations, with the at least one sensor, in the radial force from tire flatspotting; and determining, with the computer based on the signal input of the at least one sensor, a condition of the wheel assembly based on a plurality of radial harmonics of the measured variations.

2. The computer implemented method in accordance with claim 1 wherein determining a condition of the wheel assembly comprises the computer performing a spectral density analysis of the plurality of radial harmonics of the measured variations.

3. The computer implemented method in accordance with claim 1 further comprising:

measuring vibrations, with the at least one sensor, of the wheel assembly as the wheel is rotated; and determining, with the computer, a condition of the wheel assembly based on a spectral density analysis of the measured vibrations.

4. The computer implemented method in accordance with claim 1 further comprising:

outputting, with the computer, a value of the measured vibrations, wherein the value is determined by the computer using spectral density analysis.

5. The computer implemented method in accordance with claim 1 further comprising controlling, with the computer in response to the signal input from the at least one sensor, the radial force applied to the wheel assembly with the load roller.

6. The computer implemented method in accordance with claim 1, wherein the wheel balancer system further includes an adjustable tire inflation element, the method further comprising controlling an inflation pressure of the wheel assembly with the computer.

7. The method in accordance with claim 1 further comprising the computer indicating to a user a relative rotational mounting position of the tire with respect to the wheel rim to minimize the radial force variation using spectral density analysis.

8. A method of matching a tire to a wheel rim with a wheel balancer system, the wheel balancer system including a rotatable swindle, a load roller, at least one sensor and a central processing unit (CPU) responsive to the at least one sensor, the method comprising:

rotating the wheel assembly with the spindle;

determining a plurality of radial force variation harmonics of the wheel assembly by applying a force to the tire with the load roller and sensing radial vibration force:

analyzing, with the CPU and using spectral density analysis, the plurality of radial force variation harmonics; and based on the analysis, the CPU automatically detecting a flat spot condition of the tire and outputting a relative rotational mounting position of the tire with respect to the wheel rim.

9. The method in accordance with claim 8 wherein the wheel balancer system includes a load roller, and wherein determining radial force variation of the wheel assembly comprises applying a radial force to the tire with the load roller.

10. The method in accordance with claim 9, further comprising massaging, with the load roller, the detected flat spot condition.

11. The method in accordance with claim 9, further comprising determining, with the wheel balancer system, a uniformity condition of the tire as if a detected flat spot did not exist.

12. The method in accordance with claim 8 wherein the wheel rim is a bare wheel rim prior to mounting the tire thereon, said method further comprising:

determining with the CPU, the run-out of the bare wheel rim.

13. The method in accordance with claim 8 wherein the CPU determines a run out of the wheel rim using a non contact method.

14. A method of matching a tire to a wheel rim of a wheel with a wheel balancer system, the method comprising:

determining radial force variation of the wheel assembly with the wheel balancer system;

analyzing, with the wheel balancer system, the radial force variation using spectral density analysis;

detecting, with the wheel balancer system, a flat spot condition of the tire if present, and outputting, based on the analyzed radial force vibration and any detected flat spot condition, a relative rotational mounting position of the tire with respect to the wheel rim.

15. The method in accordance with claim 14 further comprising:

repeating the steps of claim 14 with at least one additional wheel and wheel assembly;

calculating, with the wheel balancer system, a spectral density analysis value that would result from the mounting of each tested tire on each tested wheel rim;

matching the tested tires with the tested wheel rims utilizing said spectral density analysis value.

16. A wheel balancer comprising:

a shaft adapted for receiving a wheel assembly, said shaft having a longitudinal axis and being rotatable about said axis so as to rotate the wheel assembly removably mounted thereon;

a sensor assembly for measuring rotation of the shaft about said longitudinal axis;

a vibration sensor assembly for measuring vibration of the wheel assembly as the wheel assembly is rotated;

a motor operatively connected to the shaft for rotating said shaft about said longitudinal axis, thereby to rotate the wheel assembly;

a load roller for applying a generally radial force to the wheel assembly;

a sensor for measuring a variation of the radial force during rotation of said wheel assembly; and a control circuit configured to determine flatspotting of the tire utilizing at least one of the measured vibration of the wheel assembly and the measured radial force variation.

17. The wheel balancer in accordance with claim 16 wherein said control circuit is configured to determine a flat spot based on a signature of the measured radial force variation.

18. The wheel balancer in accordance with claim 16 wherein said control circuit is configured to determine a flat spot based on a signature of a spectral density analysis of the measured radial force variation.

19. The wheel balancer in accordance with claim 16 wherein said control circuit is configured to determine at least one of a temporary flat spot and a permanent flat spot.

20. The wheel balancer in accordance with claim 16 configured to spin the wheel assembly with a load applied by the load roller to facilitate at least one of reducing the flat spot and eliminating the flat spot.

21. The wheel balancer in accordance with claim 16 further configured to output an indication of flatspotting and information relating to the location and magnitude of the flat spot to a user.

22. The wheel balancer in accordance with claim 16 wherein said control circuit is configured to determine what a condition of the tire would be without the flat spot.

23. A wheel balancer comprising:
- a shaft adapted for receiving a wheel assembly, said shaft having a longitudinal axis and being rotatable about said axis so as to rotate the wheel assembly removably mounted thereon;
- a sensor assembly for measuring rotation of the shaft about said longitudinal axis;
- a vibration sensor assembly for measuring vibration of the wheel assembly as the wheel assembly is rotated;
- a motor operatively connected to the shaft for rotating said shaft about said longitudinal axis, thereby to rotate the wheel assembly;
- at least one of a non-contact sensor configured to measure a radial runout of the wheel assembly and a contact sensor configured to track an outer peripheral surface of the wheel assembly with insufficient force to deform the outer peripheral surface; and
- a control circuit configured to determine flatspotting of the tire utilizing at least one of the measured vibration of the wheel assembly and the measured radial runout.

* * * * *